2,999,385
Patented Sept. 12, 1961

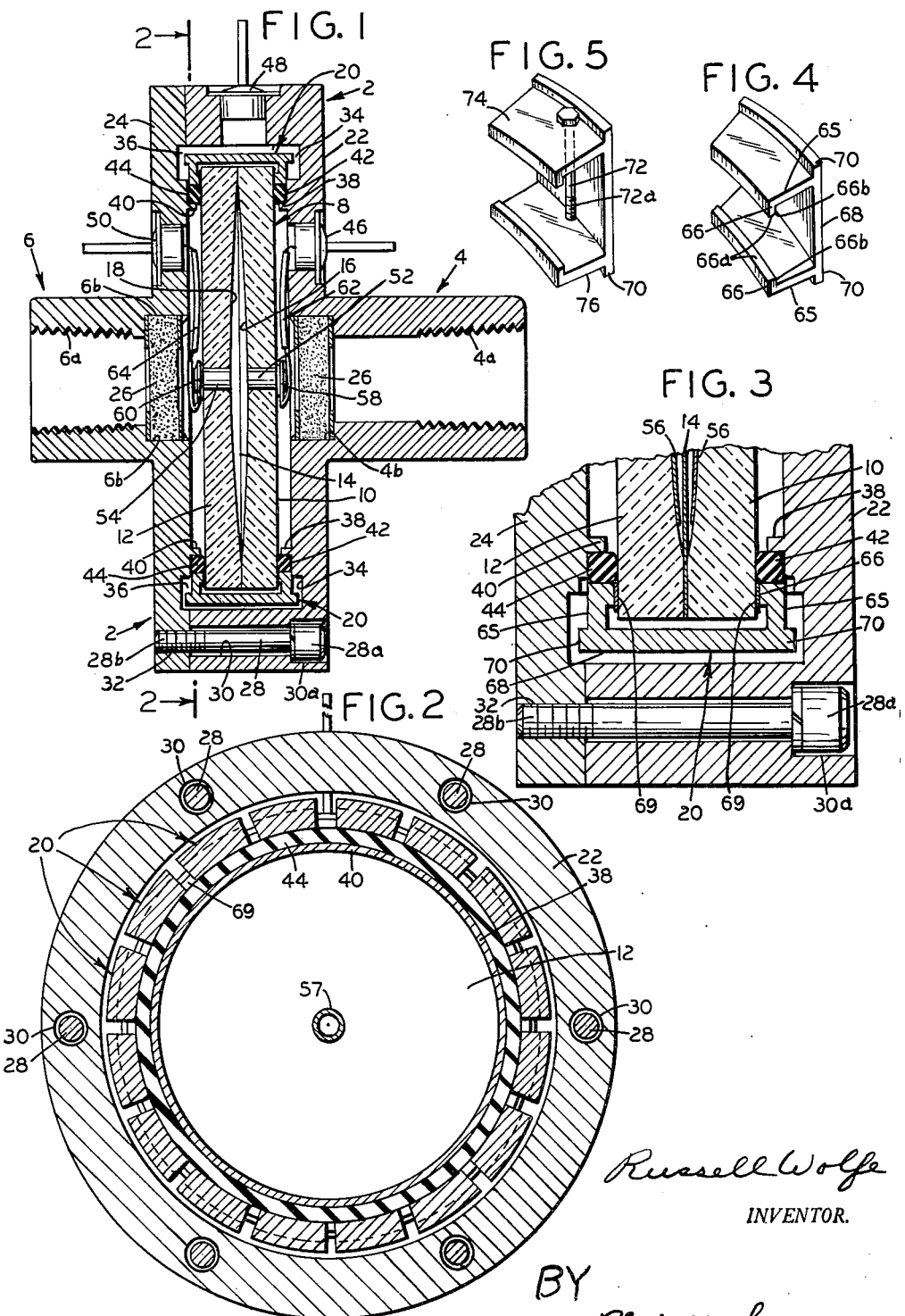

2,999,385
PRESSURE SENSING INSTRUMENT
Russell Wolfe, Lexington, Mass., assignor to Trans
Sonics, Inc., Burlington, Mass.
Filed Sept. 17, 1956, Ser. No. 610,197
2 Claims. (Cl. 73—398)

This invention relates to an improved construction for pressure sensing instruments. More particularly, it relates to an improved construction applicable to differential pressure sensing instruments having a thin stretched diaphragm as the pressure sensitive element.

Differential pressure sensing devices using a resilient diaphragm are known in the pressure sensing art. In general, such instruments include two chambers to which the fluids whose pressure is to be measured may be admitted. These chambers are separated by a fluid-impervious resilient diaphragm stretched under tension between the two chambers. When the pressures in the two chambers are the same, the diaphragm is unstressed and assumes a position which is substantially flat. However, if the pressure in one chamber is greater than is the other, then the diaphragm is deflected by this pressure difference into the chamber having the lower pressure. The diaphragm motion may be sensed by various methods and used as a measure of the pressure difference in the two chambers.

One of the more usual methods used to sense diaphragm motion is to use a metal diaphragm as the moving element in an electrical capacitor, the other capacitor electrode being located in one of the two chambers. The motion of the diaphragm then varies the distance and thus the capacity between it and the fixed plate. The variation in capacity may be sensed by placing the variable capacitor in a bridge circuit or allowing it to control a tuned circuit and measuring output frequency. The deflection of the metal diaphragm with respect to the fixed plate may also be measured by the amount of voltage which must be applied to the diaphragm to restore it to its initial undeflected position. A second plate may be placed in the other chamber to form a differential capacitor if greater sensitivity is desired.

A particularly successful device of this general nature may be made in the following manner. Two glass plates are ground flat, and then similar concave depressions or cavities are formed in the flat surfaces. The depressions are concave and are so shaped that the contour thereof conforms to the contour of the deflected diaphragm. These concave depressions have several advantages, one of which is that the instrument is not damaged by high overloads since it merely bottoms against the depression. A passage is provided in each plate leading from the center of the depression to the outer surface thereof, and the depression and the interior surface of the passage are metallized. A thin metal diaphragm is placed under considerable radial tension and then clamped between the ground surfaces of the two plates. The depressions in the surfaces of the plates together with the diaphragm form the two chambers; the passages are entrances for fluids which cause deflection of the diaphragm to thereby sense differential pressure.

The diaphragm and the metallized interior surfaces of the glass plates form a differential capacitor, the terminals of which may be attached to the metal coated passages and to the diaphragm itself. Thus, the motion of the diaphragm may be readily sensed in a bridge circuit. The glass plates with the diaphragm therebetween are enclosed in a housing to which pressure and electrical connections may be made.

Pressure sensitive devices of this type perform creditably. Thus, they are capable of a discernible difference in output signal for pressure changes as small as $1 \times 10^{-6}$ p.s.i. (about $52 \times 10^{-6}$ mm. of Hg). The shift in the zero position of the diaphragm due to all effects corresponds to a pressure change of only $1 \times 10^{-3}$ p.s.i. Such instruments exhibit virtually no hysteresis and additionally have a high natural frequency, permitting rapid response to pressure changes.

It has been found that the improved performance of these instruments is the result of applying a substantial force to clamp the two plates and the diaphragm together which elements then form a structure which behaves as a single elastic unit. In instruments prior to that just described, the diaphragms, although stretched under tension, were not sufficiently clamped between the plates to avoid relative slippage. Thus, the diaphragm would slip along the plates upon application and release of pressure. This produced a loss in precision, which although small in absolute magnitude, was of importance when an instrument of very high precision was desired. It was found that by clamping the diaphragm of an instrument having a range of about 1 p.s.i. between the plates with a force of about ½ ton many of these problems could be substantially reduced, and hysteresis virtually eliminated. Instruments using high pressures to clamp the diaphragm in place will be referred to hereinafter in the specification and claims as "clamped diaphragm instruments."

In clamped diaphragm instruments the high clamping pressure was responsible for certain additional problems. Thus, two rings pressing on the periphery of the plates with a bolt circle outside the periphery to join them caused a moment to be applied to the edges of the plates in addition to the force normal to the plates. This moment tended to cause the plates to deform slightly, thus deforming the optically ground concave depressions in the surfaces of the plates. When it is realized that the diaphragm motion to sense a pressure change of $1 \times 10^{-6}$ p.s.i. is of the order of $3 \times 10^{-9}$ inches, this is $\tfrac{3}{1000}$ of a microinch, it will be understood that even very slight warping of the plates will have serious effects on the zero shift, and thus the accuracy of the instrument.

Another problem encountered with bolted rings arose because of the glass plates and the metal clamping rings as a result of temperature changes. Because of different coefficients of expansion, a temperature rise might cause the glass to expand to a greater or lesser amount than the clamping rings tending to cause them to slide radially on the glass surface. However, because of the high force exerted by the rings, they would not slide on the plates, resulting in warping of the plate with resultant inaccurate measurement.

To overcome the problem caused the moment exerted by the bolted ring, a clamping structure was devised to exert forces normal to the plate surfaces only. In such construction the two plates with the diaphragm rest on an upstanding land, the land being slightly smaller in diameter than the glass plates, and a second plate having a similar land on the inner surface rests on the upper glass plate. An annular spring, U-shaped in cross section, is placed on the second plate and a threaded plate or ring is screwed down on the U-shaped spring. Thus, the force applied to the plate by the two lands is normal to the plate surfaces, resulting in no warping due to a moment about the point of application.

While this latter clamping construction was an improvement over the bolted rings, it did not solve the problem resulting from differential expansion. Further, it limited the range of the instrument, since only pressures of about ½ ton could be applied to hold the plates together. While these clamping pressures are satisfactory for an instrument of this type which has full scale deflection for an applied pressure difference of about 1 p.s.i., for instruments having full scale deflection at higher differential pressures, i.e. 15 p.s.i., correspondingly higher clamping pressures are required. These could not be readily obtained using the spring-urged ring and lands as described.

Accordingly, to solve these and other problems, it is a general object of my invention to provide an improved differential pressure sensitive device of the type herein described. A more specific object of my invention is to provide a device of the above character in which relative expansion of the glass plates and the clamping means will not cause plate warpage with resultant inaccuracies and zero shift. A further object of my invention is to provide a device of the above character in which the clamping forces are directed substantially normal to the plate surfaces. A still further object of my invention is to provide a device of the above character in which the clamping means is capable of exerting much greater force than those heretofore used, thus minimizing hysteresis and permitting clamped diaphragm instruments to be used at higher differential pressures. A further object of my invention is to provide a device of the above character in which a plurality of clips are used to clamp the two plates together with substantial force. A still further object of my invention is to provide a self-supporting clip for use in clamping the two plates together which is simple of design and readily applied. A still further object of my invention is to provide a device of the above character which is simple and inexpensive yet rugged in construction. Other and further objects will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIGURE 1 is a vertical sectional view of the improved differential pressure sensing instrument having the features of my invention incorporated therein, FIGURE 2 is a vertical cross section taken along the line 2—2 of FIGURE 1, FIGURE 3 is an enlarged fragmentary section of one of the clips, the plates and diaphragm to illustrate their relative position and function, FIGURE 4 is a perspective view of a preferred form of clip used to clamp the plates and diaphragm together, and FIGURE 5 is a perspective view of an alternate clip which may be substituted for the clip of FIGURE 4.

My invention relates to a construction in which the two plates and the diaphragm, which form the sensitive element of a differential pressure sensitive instrument, are clamped firmly against slippage. In general, as shown in FIGURE 1, the instrument comprises a housing generally indicated at 2, the housing being provided with pressure connections generally indicated at 4 and 6. The pressure sensitive element generally indicated at 8 includes glass plates 10 and 12 and a thin metal diaphragm 14 inserted therebetween. Concave depressions 16 and 18 are formed respectively in the interior surfaces of the glass plates. A plurality of U-shaped spring clips generally indicated at 20 are positioned about the periphery of the glass plates (FIGURE 2), the two arms of the U engaging the exterior surfaces of the plates (FIGURE 3). The U-shaped clips are preferably spring steel or other resilient material and clamped on the plates in such manner as to exert clamping forces normal thereto as will later be described in detail.

More particularly, because of the location of the bearing surfaces of the clips 20 against the plates 10 and 12, the pressure exerted by the clips is substantially normal to the plate surfaces, thus preventing plate warping as a result of a moment about the area of pressure application. The clips being self-supporting may be separated and thus do not expand and contract as a single unit, as does the previously described non-segmented bolted ring or lands. Thus the clips may expand or contract individually toward and away from the plates, as a result of temperature changes without warping the glass. Finally, the ofrce applied by each clip may be adjusted by varying its dimensions; the clips may be used to apply greater pressures than the spring-urged ring heretofore used, permitting construction of clamped diaphragm instruments for use at higher pressures without encountering difficulties as a result of plate warping. Thus this construction solves the problems heretofore associated with clamping devices used with clamped diaphragm instruments.

More specifically, the housing 2 of the instrument shown herein includes a cup-shaped housing member 22 at the right as viewed in FIGURE 1 and a circular plate 24 forming the cover therefor at the left as viewed therein. The housing members 22 and 24 have integrally formed thereon tubular pressure connections 4 and 6, respectively, extending outwardly from the central portion thereof. The interior diameters of the bores 4a and 6a of the pressure connections are tapered and threaded to receive standard fluid tight pressure fittings. Annular grooves 4b and 6b adjacent the inner surfaces of members 22 and 24 are formed for the reception of filters 26 for filtering fluids entering the interior of the instrument.

Members 22 and 24 are held together by a plurality of cap screws 28 which extend through holes 30 spaced about the peripheries of these parts. Each of the holes 30 is counterbored as at 30a to receive the head 28a of the cap screws, the threaded shank 28b of the screw engaging a tapped hole 32 in member 24.

An annular groove 34 is formed in the bottom of cup-shaped member 22 and a corresponding depression 36 is formed in cover member 24 to provide clearance for clips 20. Upstanding annular flange 38 is also formed on the bottom of member 22 radially spaced inwardly from groove 34; a similar flange 40 is formed on the surface of cover member 24. Elastomer O-ring gasket members 42 and 44 are disposed between these flanges and the arms of clips 20 to thereby seal the interior of the instrument and to resiliently support the pressure sensitive element 8, thereby preventing damage by shock, vibration, etc. The portion of housing 2 which encloses clips 20 is also sealed by gaskets 42 and 44. Three electrical terminals of conventional pressure tight design are supported in housing 2, terminal 46 extending through member 22 and terminal 48 through its side. Terminal 50 is supported by and extends through member 24.

Turning now to the construction of pressure sensitive element 8, it includes the two circular plates 10 and 12 which are preferably of non-hygroscopic glass. The opposing surfaces of these plates are first ground flat, and then concave depressions 16 and 18 are formed therein. As previously mentioned, these depressions are so shaped that their contours are the same as that of the diaphragm 14 when deflected. Thus, in case of differential pressure overloads, the diaphragm will "bottom" against the surface of the glass plate at all points simultaneously, preventing unequal stretching of the diaphragm with introduction of zero shift and hysteresis. Passages 52 and 54 extend from the centers of the depressions 16 and 18 in plates 10 and 12, respectively, to admit the fluids whose pressure is to be measured. Both the surfaces of the depressions 16 and 18 are covered with a thin metallic coating 56 (FIGURE 3) which may be conveniently applied by vacuum evaporation or a similar process; these coatings serve as the fixed electrodes of a differential capacitor, the movable member of the capacitor being the metal diaphragm 14. Coatings 56 are preferably formed of gold, for corrosion resistance, although other metals might be used. As shown in FIGURE 3, the coatings 56 do not touch diaphragm 14, unless an overpressure causes diaphragm 14 to "bottom" against them. The interior surfaces of passages 52 and 54 may also be coated in a similar fashion. However, I have found that it is preferable to insert metallic tubes 57 in the passages to connect the electrodes formed by coating 56 with the external terminals 58 and 60 on the outer surfaces of the plates. Terminals 58 and 60 are in turn connected via leads 62 and 64 to the terminals 46 and 50 extending through housing 8.

The concave contour of depressions 16 and 18 is important not only for the reasons previously given, but also because it gives greater sensitivity as compared to a flat-bottomed depression of comparable depth. This occurs because the spacing from the diaphragm to the plate surface is proportional to the amount of deflection of the various portions of the diaphragm for a given pressure difference. Also, since the diaphragm is deflected so that it is substantially positioned at all times along lines of equal potential, the voltage output of the instrument is substantially linear when used as a capacitor voltage divider.

Diaphragm 14 is preferably of stainless steel and of a thickness of about 1 mil. It is located between the plates while under considerable radial tension, and while in this condition is clamped firmly therebetween as will be discussed in more detail below. The depressions 16 and 18 in plates 10 and 12 are made substantially the same, while the undepressed portions are ground flat. Thus, the stretched diaphragm, in its undeflected position, is flat and equidistant between the metallized surfaces of depressions 14 and 16. A portion of the diaphragm which is not trimmed serves as a lead to connect diaphragm 14 to terminal 48.

As seen in FIGURE 2, a plurality of U-shaped spring clips 20 spaced about plates 10 and 12 serve to clamp the plates together with diaphragm 14 therebetween. As shown in FIGURES 1, 3, and 4, the arms 65 of the clips are provided with a land 66 extending inwardly therefrom which engages the surface of the glass plates. The base 68 of the clips are substantially parallel with edges of the plates 10 and 12. In the preferred form of clip, illustrated in FIGURES 1, 3, and 4, the arms of the U are spread slightly and the clip is slid over the two glass plates. The clips are preferably made of steel, but other materials may be used so that, upon release of the force spreading the arms, they spring inwardly and engage the surface of the plates.

The arms of the clips 20 are preferably parallel, as are the inner surfaces 66a of the lands 66 formed thereon. However, the clips are spread slightly, i.e., about 0.004", by the plates to obtain the spring force necessary to hold them together. Thus, the heel 66b of the land 66 engages the plate surface, and to insure that the high force exerted on the plate surfaces by the heel 66b of the land does not crack or damage the plates, a very thin washer 69, i.e., one having a thickness of about 0.003", is inserted beneath the clips 20. This washer is made of material such as annealed stainless steel, brass, nickel, or the like so it will be deformed by the clips and assume a shape such that the heel 66b will not cause high local surface stresses on the plates. It is sufficiently thin, however, that it has no appreciable structural strength and thus does not serve as a common member to prevent individual contraction and expansion of the clips.

The clips are spread so very slightly that the force exerted on the plates is substantially normal thereto. Should it be desired to eliminate the washer 69 by having the entire surface 66a of the land 66 bear on the plate surface, the land might be machined at a slight angle so that when the arms 65 are slightly spread apart, as when engaging the plate surfaces, the surfaces 66a will be parallel to each other and to the plate surfaces. The arms 65 of the clips might also be formed so that they converge slightly rather than being parallel. Then, when they are spread slightly by the plates 10 and 12, the surfaces of the lands 66 will be parallel.

As shown in FIGURE 2, a plurality of clips 20 are located about the periphery of the glass plates. To minimize the effects of relative expansion of the clips and plates, a relatively large number of individual clips is desirable. I have illustratively shown sixteen clips in FIGURE 2. However, for instruments of small diameter, many of the advantages of my invention might be achieved with as few as four clips, provided they are curved about the periphery of the plates as shown in FIGURE 2.

To permit ease of spreading, shoulders 70 are formed at the outer edges of the clips 20 as shown in FIGURE 4. These shoulders may be gripped by the dogs of a device similar to an automobile wheel-puller; by tightening an adjusting screw which bears on base 68 of the clip, a collar on the screw moves rearwardly, pulling the dogs with it. This action spreads the arms slightly and permits the clip to slide over the plates. The adjusting screw may then be loosened to allow the clips to firmly clamp plates 10 and 12 between arms 65. As seen in FIGURES 2, 4, and 5, base 68 of clips 20 is preferably slightly curved in cross section, and the arms 65 are preferably tapering so that the clips will fit closely about the circular plates 10 and 12.

The alternate form of clip illustrated in FIGURE 5 is similar to that shown in FIGURE 4 except that a bolt 72 extends through a hole in one arm 74 of the clip, and the threaded shank 72a of the bolt engages a tapped hole in the other arm 76. Bolt 72 is loosened and the arms of the clip are spread apart slightly by a device similar to that previously described, and the clip is slipped over the glass plates. When properly located, the spreading device is removed and bolt 72 is tightened, drawing the arms 74 and 76 tightly against the soft washer 69 to apply pressure normal to the plates.

The clips of my invention may be made in a number of ways. When a relatively small number of clips such as the sixteen herein illustrated in FIGURE 2 are to be used, a ring is preferably machined having the desired cross-sectional configuration. This ring is then cut into segments to form the clips. If a large number are to be used so that each clip subtends a relatively small angle, the clips may be cut from a machined bar having the desired cross section.

The differential pressure sensing instrument illustrated herein operates as follows: The terminals 46, 48, and 50 are connected to an electrical circuit adapted to respond to variations in capacity of the differential capacitor formed by the metallized surfaces 56 and the diaphragm 14 such as a bridge circuit or the like. Pressure connections are made to the pressure connectors 4 and 6 from the systems whose differential pressure it is desired to determine. If a differential pressure exists between the systems connected to the connectors, diaphragm 14 will be deflected toward one of the metallized surfaces and away from the other, thus unbalancing the differential capacitor and the bridge circuit to indicate both the magnitude and direction of the pressure differential.

As best seen in FIGURE 3, the force exerted by arms 65 of clip 20 is substantially normal to plates 10 and 12, and there is no moment about the point of application of the force tending to warp the plates and distort the optically ground depressions 16 and 18 therein. This insures a stable zero position since, the diaphragm-electrode spacing will not change in usage. Since a plurality of separate self-supporting clips are used, a difference in expansion coefficient of the glass plates and the metal clips will not cause warping of the glass plates. Rather, the base 68 of each clip will move slightly farther away from or toward the glass, but there will be no tendency for the clips to slide radially on the glass surface. It should be noted that the clips 20 are spaced from the side walls of the housing 2 and the clearance is provided at the ends of the clips to permit slight dimensional variations. Any tendency of the clips to expand or contract in a peripheral direction with respect to the plates is not in such a direction that it would cause plate warpage. Since each clip may expand or contract independently, the peripheral expansion of each clip does not result in radial motion of the clips along the glass, as it would if they were joined by a common member.

The pressure applied by the clips of FIGURES 4 and 5 may be varied depending on choice of materials, dimensions, and the amount of pressure applied by the bolt 72 of the alternate clip of FIGURE 5. Using sixteen clips of the type shown in FIGURE 4 spaced equidistantly about the periphery of glass plates about 2¾ inches in diameter, I have found that the total pressure applied is between 1 and 2 tons for an instrument having a range of ±1 p.s.i.; this figure compares with about ½ ton available with the spring-urged ring construction previously described. By using heavier clips in larger instruments of this type, total clamping pressures up to 10 tons may be obtained. Clamping pressures of this magnitude are satisfactory for instruments operating in the ±15 p.s.i. range. As has been explained, the high resolution and natural frequency, low zero shift, and almost complete absence of hysteresis which characterize instruments of this design are greatly enhanced by high clamping pressures to firmly and securely clamp the diaphragm 14 between the plates 10 and 12.

Thus I have provided an improved differential pressure sensing device using novel means for clamping together the two plates and the diaphragm forming the sensitive element. This clamping means is capable of exerting higher clamping pressures normal to the surface of the plates than the clamping means heretofore used in clamped diaphragm instruments. This results in better operation of the instruments in the pressure ranges previously available, and additionally permits the manufacture of instruments for higher ranges, while yet maintaining the desirable features of this construction. Since the clips exert a force normal to the surface of the plates, warping with a consequent zero shift is minimized. As a plurality of separate and self-supporting clips are used, differential expansion of the clips and plates as a result of temperature variation is also minimized. The clamping means which I have described is simple and economical of manufacture and readily assembled, with the other components of the sensitive element, to form a "clamped diaphragm" instrument which is of rugged but stable construction.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In a device utilizing a clamped diaphragm to sense the difference between opposing forces on opposite sides of the diaphragm, the combination of a diaphragm of electrically conducting material, a plate of electrically insulating material, said diaphragm being positioned under radial tension against a first surface of said plate, said first surface having a depression formed therein with said diaphragm extending thereacross, an electrode structurally fixed to said plate and located within said depression, said electrode and said diaphragm thereby forming a capacitor whose capacitance depends upon deflection of said diaphragm in response to said opposing forces, means clamping said diaphragm against said first surface at points spaced from said depression, said clamping means including a circumferentially extending clamping member engaging the surface of said diaphragm opposite to that engaged by said plate, and a plurality of separate circumferentially spaced U-shaped clips engaging the outer surfaces of said plate and said clamping member to clamp said diaphragm between said plate and said member, each arm of said U-shaped clamping clips having a projection thereon extending toward one of said outer surfaces, said projections being the only portions of said clips engaging said plate and member whereby said clips may undergo differential expansion with respect to said plate and clamping member without warpage of said plate, said clamps exerting a total clamping force of sufficient magnitude to form a unitary elastic structure of said diaphragm, said plate and said clamping member, thereby to prevent slippage therebetween upon deflection of said diaphragm.

2. Apparatus for sensing differential fluid pressure comprising, in combination, a pair of plates, said plates having opposing surfaces with opposing depressions formed therein, an electrically conducting diaphragm under radial tension disposed between said plates and against said opposing surfaces, electrodes structurally fixed to said plates and located within said depressions, said electrodes and said diaphragm thereby forming a differential capacitor whose capacitances depend upon deflection of said diaphragm in response to differences in the pressures on opposite sides thereof, means clamping said plates together against said diaphragm, said clamping means including a plurality of separate circumferentially spaced U-shaped clips engaging the outer surfaces of said plates, said clamping means including projections extending between each arm of said clips and the outer surfaces of the plates adjacent to said arms, said projections being the only force transmitting means between said plates and said clips, whereby said clips may undergo differential expansion with respect to said plates without warpage of said plates, said clips exerting a total clamping force of sufficient magnitude to form a bond between said plates and said diaphragm having sufficient strength to prevent slippage of said diaphragm between said plates resulting from deflection of said diaphragm by said differences in pressure, said plates having passages leading to their outer surfaces from said depressions.

References Cited in the file of this patent

UNITED STATES PATENTS

| | | |
|---|---|---|
| 2,090,160 | Spitzglass | Aug. 17, 1937 |
| 2,667,786 | Spaulding | Feb. 2, 1954 |
| 2,751,530 | Armstrong | June 19, 1956 |